United States Patent
Shuster et al.

(10) Patent No.: US 6,687,746 B1
(45) Date of Patent: Feb. 3, 2004

(54) SYSTEM APPARATUS AND METHOD FOR HOSTING AND ASSIGNING DOMAIN NAMES ON A WIDE AREA NETWORK

(75) Inventors: Brian Shuster, Stateline, NV (US); Johnson Leong, San Jose, CA (US); Matthew Price, Santa Clara, CA (US); Brian Lam, Sunnyvale, CA (US); Desmond Ford Johnson, Monte Sereno, CA (US)

(73) Assignee: Ideaflood, Inc., Fresno, CA (US)

( * ) Notice: Subject to any disclaimer, the term of this patent is extended or adjusted under 35 U.S.C. 154(b) by 0 days.

(21) Appl. No.: 09/386,529

(22) Filed: Aug. 30, 1999

(51) Int. Cl.[7] ............... G06F 15/173; G06F 15/16; G06F 17/30; G06F 7/00

(52) U.S. Cl. ............... 709/223; 709/245; 709/218; 709/219; 707/5; 707/7

(58) Field of Search ................ 707/102–104, 707/501.1, 513; 709/223, 232, 225, 220, 206, 219, 313, 105, 102

(56) References Cited

U.S. PATENT DOCUMENTS

| | | | | |
|---|---|---|---|---|
| 5,951,634 | A | * 9/1999 | Sitbon et al. | 709/105 |
| 6,108,703 | A | * 8/2000 | Leighton et al. | 709/226 |
| 6,442,602 | B1 | * 8/2002 | Choudhry | 709/218 |
| 6,449,657 | B2 | * 9/2002 | Stanbach et al. | 709/245 |
| 2002/0010794 | A | * 8/1999 | Stanbach et al. | 709/245 |

FOREIGN PATENT DOCUMENTS

WO    WO 99/09726    * 2/1999    ........... H04L/29/06

OTHER PUBLICATIONS

Robinson, Phillip "Hosts' Can do a lot of a Little for your Web Site" Aug. 3, 1999 Buffalo News; Buffalo N.Y.; p. D7.*

PR Newswire "Register.com Launches the Firlst and Only Free Domain Name Registration Service" Feb. 9, 1998 New York, NY; p. 1.*

Overly, Michael "Negotiating a Web Site Agreement", IEEE Spectrum, vol.: 34 Issue: 5, May 1997 Page(s): 60–66.*

Walker, Leslie "The ABCs of Web Hosting for Business", The Washington Post, Washington, DC May 6, 1999 p. E04.*

Robinson, Phillip "Hosts' Can do a lot of a Little for your Web Site" Aug. 3, 1999 Buffalo News; Buffalo N.Y.; p. D7.*

PR Newswire "Register.com Launches the Firlst and Only Free Domain Name Registration Service" Feb. 9, 1998 New York, NY; p. 1.*

Overly, Michael "Negotiating a Web Site Agreement", IEEE Spectrum, vol.: 34 Issue: 5, May 1997 Page(s): 60–66.*

(List continued on next page.)

*Primary Examiner*—Glenton B. Burgess
*Assistant Examiner*—Anita Choudhary
(74) *Attorney, Agent, or Firm*—O'Melveny & Myers LLP (57) ABSTRACT

Embodiments of the instant invention are directed to a domain management system, apparatus and method for hosting and assigning domain names. Embodiments of the domain management system comprise a name assignment system and a hosting system, wherein the hosting system comprises a domain retrieval system and a data storage apparatus. The name assignment system verifies availability and assigns domain names to requesting clients. The name assignment system comprises an input component, a confirmation mechanism and a name storage means. Preferred embodiments of the domain retrieval system comprise a scheduler, a parsing member having a plurality of redirectors and a plurality of servers. The domain retrieval system locates the domain referenced by the domain name by parsing header information and utilizing a wildcard DNS. Once the domain is located, the domain retrieval system forwards the domain to the user computer.

20 Claims, 6 Drawing Sheets

OTHER PUBLICATIONS

Walker, Leslie "The ABCs of Web Hosting for Business", The Washington Post, Washington, DC May 6, 1999 p. E04.*

"International Committee Chooses 7 New Domain Names" Report on Electronic Commerce BRP Publications vol. 4 Issue 4; Feb. 25, 1997.*

"iName Changes Name to Mail.com" PR Newswire; New York; Feb. 1, 1999.*

Mail.com Homepage from Feb. 15, 1998 <<http://web.archive.org/web/19980215234527/http://www.mail.com/>>.*

Robinson, Phillip "Hosts' Can do a lot of a Little for your Web Site" Aug. 3, 1999 Buffalo News; Buffalo N.Y.; p. D7.*

PR Newswire "Register.com Launches the Firlst and Only Free Domain Name Registration Service" Feb. 9, 1998 New York, NY; p. 1.*

Overly, Michael "Negotiating a Web Site Agreement", IEEE Spectrum, vol.: 34 Issue: 5, May 1997 Page(s): 60–66.*

Walker, Leslie "The ABCs of Web Hosting for Business", The Washington Post, Washington, DC May 6, 1999 p. E04.*

"International Committee Chooses 7 New Domain Names" Report on Electronic Commerce BRP Publications vol. 4 Issue 4; Feb. 25, 1997.*

"iName Changes Name to Mail.com" PR Newswire; New York; Feb. 1, 1999.*

Mail.com Homepage from Feb. 15, 1998 <<http://web.archive.org/web/19980215234527/http://www.mail.com/>>.*

Microsoft Computer Dictionary, Fourth Edition by Microsoft Corporation ISBN:0735606153 Microsoft Press © 1999 (541 pages).* http://www.techweb.com/encyclopedia/defineterm?term= parse "TechEncyclopedia".*

"Virtural Host examples for common setups" http:/httpd.apache.org/docs/vhost/examples.html; pp. 1–9, Apache Http Server Version 1.3 Apr. 2003.*

"Domain Names—Concepts and Facilities" By P. Mockapetris, IETF RFC—1034; Nov. 1, 1987, XP002164250; pp. 25–26; p. 31.

"Development Of The Domain Name System" By P. V. Mockapetris, Sigcomm Symposium Communications Architectures & Protocols, ACM Press, US, vol. 18, No. 4, Aug. 16, 1988; pp. 123–133; XP000199906; paragraph '02.2!; paragraph '03.3!.

* cited by examiner

Web Jump
SIGN UP

SIGN UP — 40

WEBJUMP HOME

HOSTING SERVICES
SIGN UP

SITE MANAGEMENT
USER NAME:
[ ]
PASSWORD:
[ ]
[Log In]

SUPPORT
QUICK START
FTP INFO
TUTORIALS
CGI INFO
FORGOTTEN PASSWORDS
TECHNICAL SUPPORT
WEBJUMP NEWSLETTER

WEBMASTER RESOURCES
MARKETING TOOLS
LITERATURE

FREQUENT QUESTIONS

CONTACTS
SUPPORT INQUIRIES
ABUSE

SEARCH WEBJUMP
[ ]
[Search]
Advanced Search

Congratulations on choosing Web Jump for your web hosting needs

Please complete the new customer contact form below to set up a new account with WebJump The following information is considered confidential and is used solely by Web Jump Technical Support and Customer Service - with the following exception if you are registering a domain e.g www.mysite.com, then this information is sent to interNIC for billing contact information. You must enter a company name to register a domain name. If you are not operating a company with a DBA (Doing Business As) name, you can simply enter a ONE WORD name for your website.

Important! While filling out this form, please enter your e-mail address correctly because your password will be sent back to you via e-mail. Also, use NUMBERS ONLY in the phone and fax fields. No special characters such as commas, periods, parenthesis, dashes or spaces or your registration won't go through.

WebJump New Customer Contact Form

| | |
|---|---|
| Company/Site Name | [ ] — 50 |
| First name | [ ] — 50 |
| Last name | [ ] — 50 |
| Phone | [ ] |
| Fax (optional) | [ ] |
| E-mail (required) receive FTP password | [ ] |
| Retype E-mail | [ ] |
| Address | [ ] |
| City | [ ] |
| State | [none ▼] |
| Zip | [ ] |
| Country | [United States ▼] |

} 46

[Let's create the web site name -->]

FIG. 3b

SIGN UP

48

DOMAIN EDITOR
In four simple steps you can customize your web sites name. A site's name is composed of a top level domain (e.g. .com) and four levels of sub-domain names. Each step in the process modifies one of the optional sub-domains. You can experiment as much as you like before pressing the Submit button.

STEP 1: Use the pull down list to choose from the list of available domains.

[webjump ▼] .com — 52

STEP 2: edit the text in this field to change the site name you entered on the previous page. Click outside the editing box to view the updated change. Use letters and numbers only. No spaces or special characters allowed. DO NOT USE PERIODS. (click outside the field to see the results).

Site Name [                    ] — 54

STEP 3: (OPTIONAL) Further specify your site name by adding a professional (e.g. dentist.jumphealth.com) or interest area (e.g. mustang.jumpauto.com). Select the none button to remove entry.

Professional [                    ]
Interest     [                    ]  } 56
None STEP 4: (OPTIONAL) Would you like your web site classified by your location?
Select the state or country button. Select the None button to remove an entry ◉ None        ○ State        ○ Country Proposed Name [                    ] — 58

Once the web site name above is to your liking, simply press submit to see if it is available!

[Submit] — 60

---

WEBJUMP HOME

HOSTING SERVICES
SIGN UP

SITE MANAGEMENT
USER NAME:
[          ]
PASSWORD:
[          ]
[Log In]

SUPPORT
QUICK START
FTP INFO
TUTORIALS
CGI INFO
FORGOTTEN PASSWORDS
TECHNICAL SUPPORT
WEBJUMP NEWSLETTER

WEBMASTER RESOURCES
MARKETING TOOLS
LITERATURE

FREQUENT QUESTIONS

CONTACTS
SUPPORT INQUIRIES
ABUSE

SEARCH WEBJUMP
[          ]
[Search]
Advanced Search

FIG. 4

```
; db.webjump.com
;
@       IN      SOA     ns0. sbusiness.net.  dns-admin.sbusiness.net.  (
                        1999060400      ; Serial
                        604800                  ; Refresh (3 hours)
                        3600            ;retry (1 hour)
                        1209600                 ; Expire (1 week)
                        300 )           ; TTL (5min)

IN      NS ns01.sbusiness.net.
                IN      NS ns02.sbusiness.net.
                IN      NS ns03.sbusiness.net.
                IN      NS ns04.sbusiness.net.

IN      MX      10      mail. sbusiness.com.
@                       IN      A       216.49.10.14
*.webjump.com                   IN  A   216.49.10.200
freehosting.at                  IN  A   216.49.10.240
```

SYSTEM APPARATUS AND METHOD FOR HOSTING AND ASSIGNING DOMAIN NAMES ON A WIDE AREA NETWORK

FIELD OF THE INVENTION

Embodiments of the invention are directed to a system, apparatus and method for hosting domains and assigning domain names to users, wherein the domain name is defined, in part, by the user. More specifically, embodiments of this invention create user assigned subdomain names by combining the hosting domain name and the user name request such that the subdomain name resides within the zone file of the hosting domain name, that is, it resides at the same IP address.

BACKGROUND OF THE INVENTION

Wide area networks, such as the World Wide Web ("WWW"), or the Internet, are developing in importance both in commerce and in general methods of communications among the population. Indeed, businesses advertise and sell products over the WWW. Internet businesses, which are exclusively virtual businesses, that is, they exist only on-line, have become an acceptable modality of doing business. Similarly, individuals have utilized the WWW for more effectively communicating with family and friends.

The information made available on the WWW is located on a web site, wherein each web site is addressed by a domain name. Thus, to establish a web site, a user must obtain a domain name.

Currently, to obtain a domain name, the user, including individuals or business owners, must acquire a fully qualified domain name, such as, www.domainname.com, or a shared domain name, such as, www.domainname.com/usersites/~mysiteaddress. Although the qualified domain name is the most desirable due to its relative uniqueness and simplicity, qualified domain names are not only difficult to obtain, but are also, expensive. Thus, usually only persons, web host providers or entities acquire the fully qualified domain names.

Currently, any fully qualified domain name or variation thereof is assigned a unique Internet Protocol ("IP") address. To provide an IP address for each domain or subdomain name, the provider must acquire large blocks of IP address block licenses. Unfortunately, these blocks of licenses are often unavailable, and even if available, are expensive.

In contrast to the fully qualified domain names, the shared domain names are typically available at relatively low cost and can be obtained with relative ease. Thus, the shared domain names are more advantageous and desirable for individual users.

Despite the low cost and easy acquisition of shared domain names, shared domain names are not necessarily user friendly. Indeed, most shared domain names are complicated and cumbersome. Thus, users who desire a simple, professional and easy to remember domain name, instead acquire difficult to remember and lengthy domain names.

In addition to the cumbersome nature of the shared domain names, categorization and/or prioritization of information on the WWW by search engines and other modalities place shared domain name users at a disadvantage as domain names, such as, fully qualified domain names, that contain a desired search term are given greater weight in the search results. For example, www.news.com will probably be given a preferential position in a search result relative to www.mysite.com/users/~news. Thus, users utilizing a shared domain name are disadvantaged in maximizing and directing network users, or traffic, to their web site.

When a user requests a qualified domain name, the domain name is manually entered into a Domain Name System ("DNS"), database. The database must then be uploaded so that the database is updated on the network server. Manual entry and the uploading of all of the newly requested domain names requires an enormous amount of personnel and time. Thus, a web host provider, who desires to host thousands of subdomain names, must expend a large amount of resources simply to enter the requested names into the system.

In addition to the expense of entering the newly requested domain names, providers of domain names experience further problems. For instance, most servers are not designed to effectively manage more than several thousand domains. Indeed, these servers are incapable of arbitrarily scaling domains, wherein scaling allows the servers to host a large number of domains than typically expected or capable of being hosted on the server. To compensate for the inability to arbitrarily scale the domain names, domain names are mapped to user directories. This mapping results in inefficient server performance.

Further, the current system for distributing domain names results in DNS latency time, that is, the time required for a new domain name entry to propagate throughout the WWW. Currently, the latency time is typically 24 to 72 hours (1–3 days).

A need in the industry exists for a system of hosting and assigning domain names that is cost efficient and provides individual users with shorter and more memorable domain names. A further need exists for a system that reduces the amount of time required to enter the new domain name into a database and further, which reduces the DNS latency such that domain names are more quickly introduced onto the wide area network.

SUMMARY OF THE DISCLOSURE

Embodiments of the instant invention are directed to a domain management system, apparatus and method for hosting and assigning domain names. Embodiments of the domain management system comprise a name assignment system and a hosting system, wherein the hosting system comprises a domain retrieval system and a data storage apparatus.

The name assignment system verifies availability and assigns domain names to requesting users. The name assignment system comprises an input component, a confirmation mechanism and a name storage means, wherein the user inputs a desired domain name into the input component. The desired name is confirmed or denied. If the request is approved, an assigned domain name, which includes the user's request as a portion of the name, is stored in a provider maintained name storage means.

Preferred embodiments of the domain retrieval system comprise a scheduler, a plurality of redirectors and a plurality of servers. The domain retrieval system locates the domain referenced by the domain name by parsing header information and utilizing a wildcard DNS. Once the domain is located, the domain retrieval system forwards the domain to the user computer.

A feature of embodiments of the instant invention is that the assigned domain names share an IP address with the hosting domain name. An advantage to this feature is that the web host provider is not required to acquire large number of address block licenses, thereby eliminating substantial cost and dependency on availability of these address blocks.

Another feature of embodiments of the instant invention is that the servers are capable of scaling domain names. An advantage to this feature is that the servers are capable of managing virtually unlimited numbers of domains.

Still another feature of embodiments of the invention is the elimination of the need to update the DNS database. An advantage to this feature is the reduction in web host provider costs for staffing personnel required to input the large number of domain names. A further advantage is the reduction in the delay time, or DNS latency time, of circulating new domain names on-line.

Yet another feature of embodiments of the instant invention is that the domain names assigned to the users are user friendly, that is, the assigned domain names are simple and easy to list. An advantage to this feature is that users, and network users, are more capable of remembering the domain names and the simplicity of the name further increases its recognition.

Still another feature of embodiments of the instant invention is that the user requested portion of the assigned domain names is prominently positioned in the domain name. An advantage to this feature is that the retrievability of the domain name by a search engine is increased.

The above and other features and advantages of embodiments of this invention will be apparent from the following more detailed description when taken in conjunction with the accompanying drawings of illustrative embodiments.

BRIEF DESCRIPTION OF THE DRAWINGS

The detailed description of embodiments of the invention will be made with reference to the accompanying drawings, wherein like numerals designate corresponding parts in the figures.

FIG. 3a is a sample web page illustrating a preferred embodiment of an input component of the name assignment system of FIG. 2.

FIG. 3b a sample web page illustrating a preferred embodiment of a domain name input member of the name assignment system of FIG. 2.

DETAILED DESCRIPTION OF EMBODIMENTS

Embodiments of the instant invention are directed to a method and apparatus for hosting and assigning domain names on a wide area network. Embodiments of the instant invention employ a network of computers and programs for assigning domain names and retrieving domains on a wide area network, such as, the WWW or the Internet.

Hardware Environment

Figure 1:
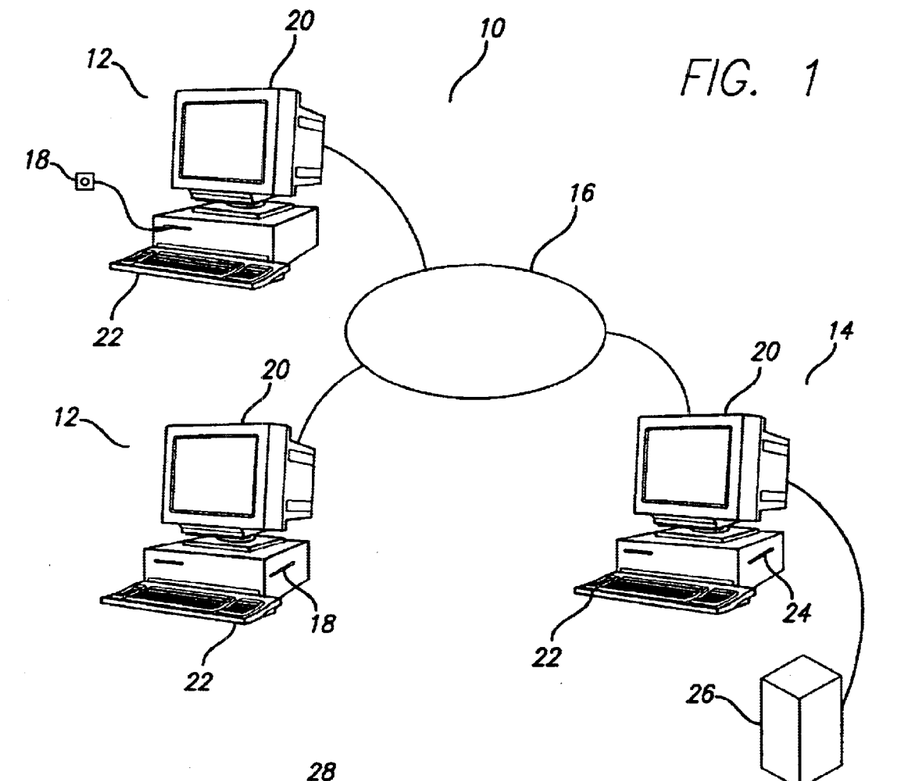
FIG. 1 is a network system environment in accordance with a preferred embodiment of the instant invention.

Preferred embodiments of the instant invention operate with a network comprising a plurality of networked computers, such as, for example, at least one user computer and at least one provider computer which are coupled together in a communications network, such as, for example, the Internet or WWW. FIG. 1 depicts a simplified representation of an example network system 10 that is operated in accordance with preferred embodiments of the invention.

The network system 10 includes at least two client or user computers 12 and at least one provider, or content, computer 14 coupled for communication therebetween by the remainder of the network, generally represented at 16. In the illustrated embodiment, two client or user computers 12 and two content provider computers 14 are shown in the network system. It will be understood that further embodiments may employ any suitable number of user and provider computers. The network system 10 may comprise a closed or intranet configuration, an open or public-access network configuration or combinations of such configurations, as is well known in the art. For example, the user and provider computers 12 and 14 may be included in smaller, interconnected networks which compose the overall network system 10. In an Internet embodiment, the network system 10 comprises a combination of a large number of interconnected internets and intranets. For purposes of simplifying the present disclosure, the various hardware components (for example, host servers, routers, connectors) and software necessary for communication between computers on the network system are not described herein in detail. Such hardware and software are well within the scope of one of ordinary skill in the art and are at least partially dependent upon the type of network system employed and the desired application of use.

The user computer 12 may comprise any suitable network device capable of communicating with other network devices in the network system. In preferred embodiments, the user computer 12 comprises a programmable processor capable of operating in accordance with programs stored on one or more computer readable media 18 (for example, but not limited to floppy disc, hard disc, computer network, random access memory (RAM), CD Rom, or the like), a display device 20 for providing a user-perceivable display (for example, but not limited to visual displays, such as cathode ray tube CRT displays, light-emitting-diode LED or liquid-crystal-diode LCD displays, plasma displays or the like, audio displays or tactile displays), and a user input device 22 (for example, but not limited to, a keyboard, mouse, microphone, or the like). In one preferred embodiment, the user computer comprises a personal computer system having a CRT display, a keyboard and a mouse user-input device.

The user computer 12 is controlled by suitable software, including network communication and browser software to allow a user to request, receive and display information (or content) from or through a content provider computer 14 on the network system 10. In preferred embodiments, the user computer 12 employs a program, such as a browser, for displaying content received from a provider computer 14.

The content provider computer 14 may comprise any suitable network device capable of providing content (data representing text, hypertext, photographs, graphics video and/or audio) for communication over the network. In preferred embodiments, the provider computer comprises a programmable processor capable of operating in accordance with programs stored on one or more computer readable media 24 (for example, but not limited to to, floppy disks, hard disks, random access memory RAM, CD-ROM), to provide content for communication to a user computer 12. The provider computer may comprise, for example, but not limited to, a personal computer, a mainframe computer, network computer, portable computer, personal data assistant (such as, a 3Com Palm Pilot), or the like. The provider computer 14 may include one or more internal data storage devices (not shown) for storing content for communication to a user computer 12. Alternatively, or in addition, the provider computer 14 may be coupled to an external data storage device, computer or other means, generally represented at 26, from which the provider computer 14 may obtain content for communication to a user computer 12. In one embodiment, the external device 26 may comprise a further network device coupled in the network 16.

In a preferred environment, the content provider computer 14 is controlled by suitable software to respond to a valid request for content by providing (or downloading) data in the form of one or more HTML files to the user computer 12 from which the request was made. It will be understood by those skilled in the art that this process involves communications through suitable servers, routers and other components, as is dictated by the particular network environment. The HTML file(s) correspond to one or more HTML frames which, in conjunction with the browser software at the user computer 12, is displayable on the display device at the user computer as text, hypertext, photographs, graphics, sound, or the like, in a form that is perceivable to the user.

General Description of Preferred Embodiments

Embodiments of the domain management system comprise a name assignment system 28 and a hosting system 62, wherein the hosting system 62 comprises a domain retrieval system 64 and a data storage apparatus 66.

Figure 2:
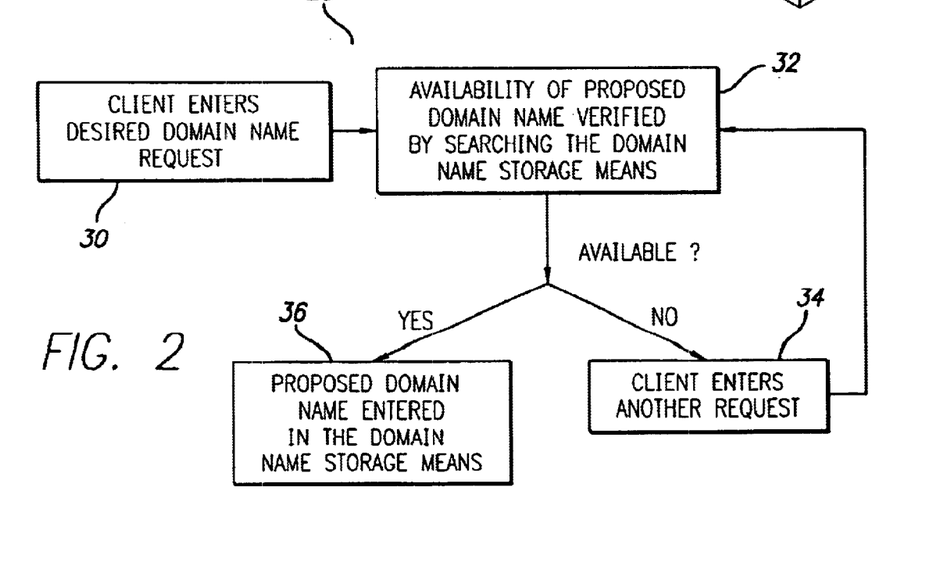
FIG. 2 is a block diagram of a name assignment system in accordance with a preferred embodiment of the instant invention.

The name assignment system 28 verifies availability and assigns domain names to requesting clients. The name assignment system 28 comprises an input member 40, a confirmation means 42 (not shown) and a domain name storage means 44 (not shown). With reference to FIG. 2, a user desiring to obtain a domain name enters a desired domain name 30 via the input member. Once entered, the provider computer 14 verifies the availability of the desired domain name 32 by the confirmation means 42. If the proposed domain name is not available, the user can enter another request 34. If however, the proposed domain name is available, the domain name is entered in the name storage means 36.

The input member 40 is any mechanism that accepts information from the user. In one embodiment, the input member 40 is a plurality of web pages.

With reference to FIGS. 3a and 3b, the input member 40 comprises a client data input member 46 and a domain name input member 48. The client data input member includes a plurality of input windows 50 that are configured to accept any type of provider defined information, including, but not limited to, a company name, the client's name, the client's phone number, the client's E-mail address, and the client's post office address. Once entered, the client information is stored on the provider computer, by any suitable means, including, but not limited to, a text file and a database.

The domain name input member 48 allows the client to customize a portion of a domain name. As is commonly understood, domain names can include an infinite number of levels, however, domain names are usually limited to a particular number of levels for convenience. For instance, in one embodiment, domain names can include a "top level", "second level", "third level" and "fourth level". In a fully utilized domain name, the domain name reads as follow: fourthlevel.thirdlevel.secondlevel.toplevel. It is to be understood that a domain name need not utilize all four levels, but can include any number of levels in an ascending order. For instance, the domain name can read, for example, as "secondlevel.toplevel" or "thirdlevel.secondlevel.toplevel".

Figure 4:
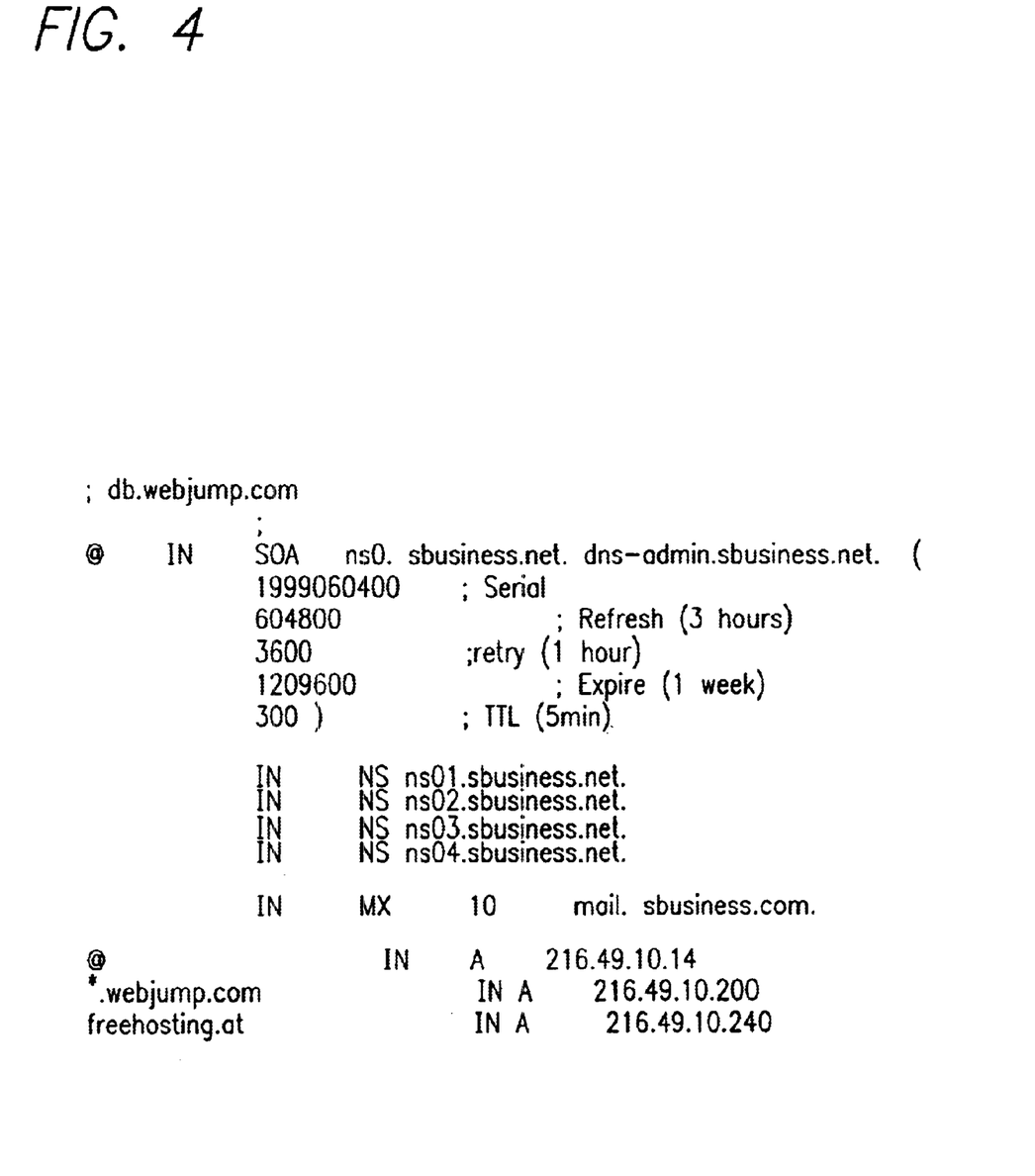
FIG. 4 is a preferred embodiment of portion of a DNS database, wherein the provider domain name is stored utilizing a wildcard.

In preferred embodiments, the provider utilizes the toplevel and secondlevel portions of the domain name for the provider chosen domain names. However, it is to be understood, that the provider can define any number of name levels and this is not intended to limit the invention. The provider chosen domain names are stored in a DNS database. In preferred embodiments, the provider chosen domain names are stored with a wild card, such as, "*.providerdomainname.com", wherein the wildcard, "*", indicates that other levels may exist. Indeed, it is intended that these other levels be used by clients. FIG. 4 illustrates a sample DNS database which includes a wildcard entry for a provider domain name "webjump.com".

Embodiments of the instant invention utilize this domain name convention in conjunction with the wildcard DNS in allowing the clients to define a portion of their domain name. As stated above, the provider can define any number of name levels. Depending upon how many of the name levels are defined by the provider determines which name levels can be defined by the clients.

With reference to FIG. 3b, the domain name input member 48 comprises a provider domain name box 52, a site name input box 54, a client interest input box 56, a proposed name box 58 and a submit button 60. The site name input box 54 is a window, wherein the client inserts his desired site name. The portion of the domain name chosen by the client as the site name is the third level domain name.

The client interest input box 56 is a window that allows the client to further define his domain name. For instance, in one embodiment, the client can input his profession or an interest. This information is added to domain name at the fourthlevel.

The information input by the client is added to the provider domain name. Once the client has input either the sitename, or the sitename and an interest, a proposed domain name is presented to the client in the proposed name box 58 based upon his input. For instance, if the client only inputs a sitename, the proposed domain name is "sitename.providerdomainname.com". Similarly, if the client inputs a sitename and an interest, the proposed domain name is "sitename.interest.providerdomainname.com". If the proposed domain name is acceptable to the client, the client submits the proposed domain name to the provider computer via depressing the submit button 60, or by any other means capable of transmitting the proposed name to the provider computer.

Upon submission, the proposed domain name is transmitted to the confirmation member. The confirmation member is a program that searches the domain name storage means for the proposed domain name. In one preferred embodiment, the domain name storage means is a register of all of the client assigned domain names, which is maintained by provider computer 14. The confirmation member is capable of quickly searching the domain name storage means or register as the toplevel and secondlevel portions of the domain is constant and the program is only required to review the thirdlevel, and in some instances, the fourthlevel. In one preferred embodiment, the program for searching the register is written in Active Server Pages ("ASP") language, although any programming language, including, but not limited to, C++, Visual Basic ("VB") and Perl are suitable.

After the provider computer determines whether the requested domain name is available, the provider computer 14 notifies the client of the results. If the requested domain name is available, the provider computer 14 notifies the client that the domain name is accepted. The provider computer 14 notifies the client of the availability of the requested name, by any suitable means, including, but not limited to, posting a message on the client's computer 12, electronic mail service, postal service and telephone service. In one preferred embodiment, the confirmation is posted on a web page on the client's computer 12 so that the client has virtually instantaneous confirmation or denial. If the request is denied, the client is able to input another request. After the new domain name has been assigned to the client, the newly assigned domain name is automatically stored in the domain name memory means that is, the provider maintained register is updated. As the provider maintains a register of assigned names, there is no need to update the DNS database and therefore, no requirement to reload the DNS database. Indeed, the DNS database is only updated if a new provider chosen domain name is added.

It is to be understood that the above described embodiment is not intended to limit the invention. For instance, in other embodiments, the input of the client data and the preferred domain name by the client need not be accomplished via a client computer. Rather, the client could utilize any suitable means of identifying a preferred domain name, including, but not limited to, telephone services and postal services. In this embodiment, the provider would verify the availability of the client's requested domain name and the assignment of the name would be entered and recorded as described above. In still a further embodiment, the provider distributes the domain names by any suitable means, including, but not limited to, an auction. In an auction environment, the provider receive bids from clients, wherein the domain name is assigned to the highest bidder. In this manner, the name assigned to the highest bidding client would be recorded in accordance with the embodiments described above.

Figure 5:
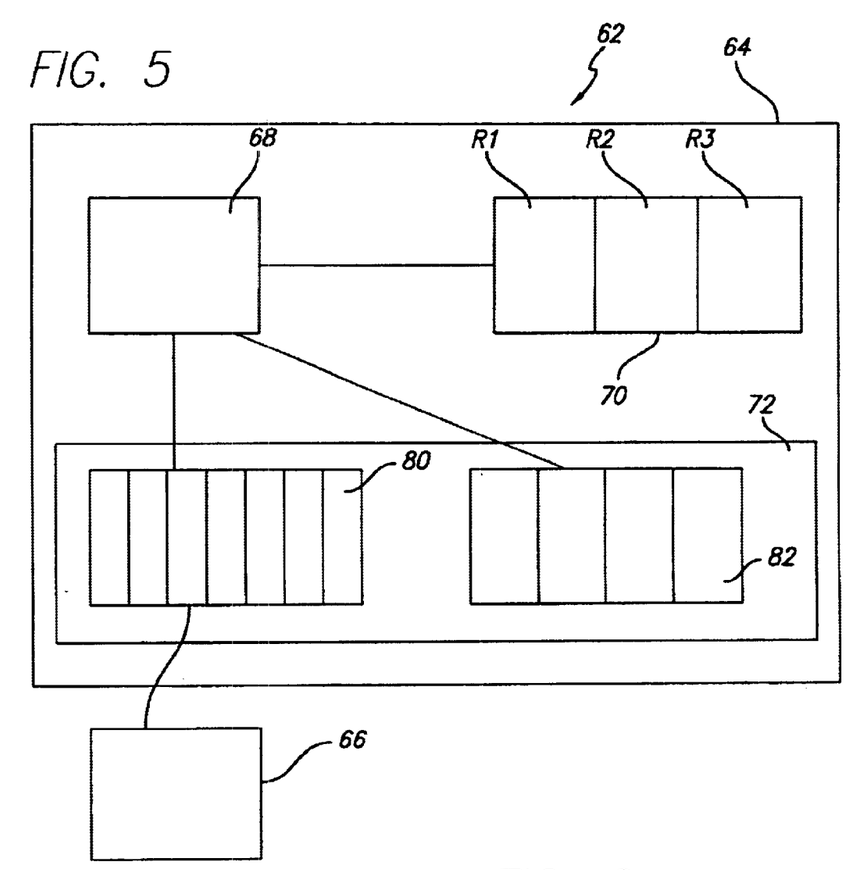
FIG. 5 depicts a preferred embodiment of the domain retrieval system.

As indicated above, the hosting system 62 comprises a domain retrieval system 64 and a data storage apparatus 66. The hosting system 62 operates in conjunction with the name assignment system 28 discussed above.

When any network user, including a client, enters a request into the browser for an assigned domain name, such as, for example, http://sitenamei.webjump.com, the DNS resolves the requested domain name to its Virtual Internet Protocol ("VIP") address. By default, incoming browser requests for any subdomain to "providerdomainname.com" is forwarded to the host VIP address for the domain "providerdomainname.com". This is achieved by including the wildcard entry into the domain's zone file in the form of "*.providerdomainname.com" as shown in FIG. 4 for webjump.com. Thus, instead of the zone file including all possible subdomain names, such as, "sitename.providerdomainname.com", wherein each subdomain would have its own IP address, the request is directed to the address of the wildcard entry "*.providerdomainname.com". For example, in one embodiment, the domain name "sitename.webjump.com" resolves to 216.49.10.200, wherein "webjump.com" is the provider chosen domain name. The resolved VIP address is then transmitted to the domain retrieval system.

With reference to FIG. 5, a preferred embodiment of the hosting system 62 comprising a domain retrieval system 64 and a data storage apparatus 66. The domain retrieval system 64 comprises a scheduler 68, a plurality of redirectors 70 and a plurality of servers 72. Upon resolution of the VIP address, the VIP address is transmitted to the scheduler 68. The scheduler 68 is a traffic director that load balances the requested VIP address across the plurality of redirectors 70. Although any mechanism to load balance network user requests is suitable, in one preferred embodiment, a scheduler, manufactured by Resonate, is utilized.

The redirectors 70 are servers which include a parsing mechanism. In one embodiment, the plurality of redirectors 70 comprises a first redirector R1, a second redirector R2 and a third redirector R3. It is to be understood that the number of redirectors is not intended to be limited and embodiments can include more or less than three redirectors.

Prior to transmitting the request, the scheduler 68 chooses a particular redirector to receive the request, wherein the redirector that receives the request is determined by the current load on the particular redirector. For example, if the load on the first redirector and the third redirector is 80%, and the load on the second redirector is 20%, the scheduler passes the request to the second redirector R2.

Upon receipt of the request by the redirector, in this example, redirector R2, the parsing mechanism parses the URL request of the client or network user and translates the request into a predefined provider subdomain and a client directory. Each predefined provider subdomain identifies a provider chosen domain name utilized in the client assigned domain names. For instance, in one embodiment, a series of subdomains are called "freehosting.at.*", wherein the providerdomainname.com is substituted for the wildcard. Thus, for the provider chosen domain name "webjump.com", the subdomain is "freehosting.at.webjump.com". The identification of the toplevel and secondlevel portion of the requested domain name identifies the appropriate subdomain to be referenced. It is to be understood that an IP address of the subdomain can also be used to identify the provider chosen domain.

In addition to identifying the subdomain from the request, the parsing mechanism removes the site name from the Hypertext Transfer Protocol ("HTTP") header information of the request, wherein the site name identifies the appropriate directory on the subdomain. In one preferred embodiment, the HTTP version 1.1 header content information is utilized. Once the appropriate directory is determined, the HTTP request is directed to the appropriate directory within the provider file system, thereby mapping URLs to the provider file system directory structure. For example, "sitename.webjump.com" translates to the directory of freehosting.at.webjump.com/si/sitename-webjump, wherein the directories si/sitename-webjump are defined by the particular site name. It is to be understood that any directory naming convention can be used and this is not intended to be limiting.

Figure 6:
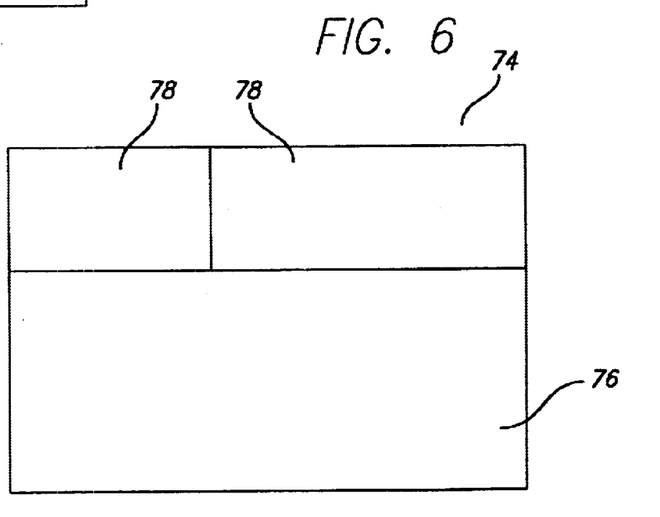
FIG. 6 depicts a preferred embodiment of a frameset that is transmitted to the client's computer from the domain retrieval system of FIG. 5.

Once the parsing of the address is complete, the redirector transmits an empty frameset 74 to the client computer 12, wherein the frameset 74 includes a plurality of frames. With reference to FIG. 6, the frameset 74 is provider defined and includes a client frame 76 and a plurality of provider frames 78. The client frame 76 is typically the larger of the frames and represents the space within which the client's information will be contained.

The provider frames 78 represent the predefined space wherein the provider will add information. The provider frames 78 include, but are not limited to, advertising information, revenue information and navigation information. In one embodiment, provider frames 78 are not included in the frameset 74, rather, only a client frame 76, or frames, are transmitted to the client computer 12.

In response to the receipt of the frameset 74, the user computer 12 requests the Uniform Resource Locator's ("URL's") for the various frames contained within the frameset 74 from the provider computer 14. The request for the client frame 76 is resolved to the VIP address of the subdomain by DNS. For example, "freehosting.at.webjump.com/si/sitenamewebjump/" resolves to 216.49.10.245. Similarly, the request for the provider frame 78 is resolved to a VIP address. For example, URLs for the provider computer, bannervip.webjump.com/webjump/revenue_ad.asp and bannervip.webjump.com/webjump/house_ad, resolves to 216.49.10.236. These addresses are then transmitted to the scheduler 68.

In turn, the scheduler 68 load balances the VIP addresses across the plurality of servers 72. With reference again to FIG. 5, in preferred embodiments, the servers 72 comprise a plurality of web servers 80 and a plurality of provider servers 82. The frame URL associated with the client files are requested by the user computer 12 to the web servers 80. Similarly, the frame URL associated with the provider files are requested by the user computer to the provider servers 82.

The web servers 80 access the data storage array 66 for the requested information. The data storage array 66 is a NetApp F76P, although any storage means capable of storing data files, including, but not limited to, hard disk and tape, is suitable. The information from the provider server 82 and the content server 80 that corresponds to the URLs is transmitted to the user computer such that the frames in the frameset 74 are displayed with information.

Figure 7:
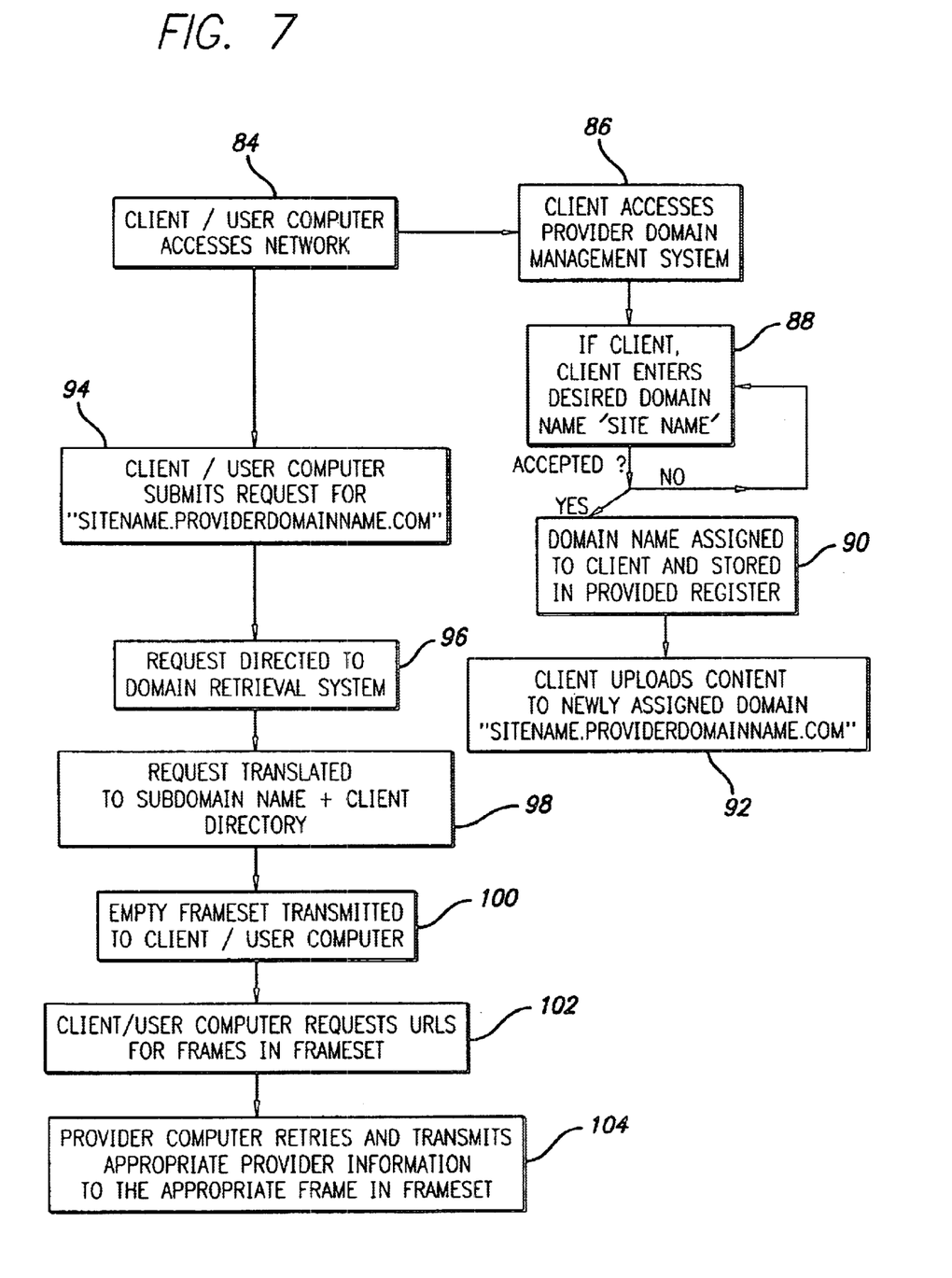
FIG. 7 is a block diagram of a preferred embodiment of the overall process of the domain name assignment and the retrieval of the domain associated with the assigned domain name.

With reference to FIG. 7, in operation, the domain management system facilitates the assignment of domain names to clients and the retrieval of the domains reference by those domain names. To set up a domain name, a client enters the network 84 and accesses the provider computer's domain management system 86, in particular, the name assignment system, or sign-up page. The client enters a desired name for the third and, in some instances, the forth level portion of the domain name 88. Once the client has successfully been assigned a name, the domain name is stored on the provider computer in, for example, a register, a text file listing or a catalog, although any manner of compiling the assigned domain names is suitable 90. No updating of the DNS database is required.

The client now determines the content he desires to include on his newly assigned domain and transfers that data to the provider computer, by any suitable means, including, but not limited to, file transfer protocol ("FTP") and HTTP 92. The content of the domain is now referenced by its directory on the provider's data storage array 66.

When the client desires to retrieve his domain, or wide area network, or remote, users desire to visit the web site, the client/users access the network 16. The client/user then submits a request for the desired domain 94 which is transferred from the user computer to the provider computer. The provider computer directs the request to the domain retrieval system 96 which translates the request to a provider defined subdomain name a client directory contained on that subdomain 98. Once the request is translated, the provider computer sends the user computer an empty frameset 100, wherein the frameset 74 includes a plurality of frames. The user computer, in turn, requests the data that is intended to occupy the frames in the frameset 102. The provider computer 14 then links the data request with the content server 80 and the provider server 82. The content server 80 accesses data storage containing the client's data associated with the domain name and transmits the data to the appropriate frame in the, frameset 104. Similarly, the provider server transmits the appropriate provider information to the appropriate frame in the frameset 104.

As shown from above, embodiments of the domain management system provide a friendly system by which clients can partially define their domain names and receive a domain name that is memorable and that increases the client's ability to direct traffic to the domain.

Indeed, in embodiments of the instant invention, the assigned domain name places the client designated portion first such that the client's name is prominent. Further, as the client is permitted to choose a third or fourth level domain names, the clients can more accurately choose their domain name so as to more effectively direct traffic, that is, direct other users to a specific site which is referenced by the domain name. For example, a provider may designate a third level domain "dogs.webjump.com" as a domain directed to dog-related sites. The client could then choose a fourth level of the domain name, "bobspuppystore", such that the domain name assigned to the client is "bobspuppystore-.dogs.webjump.com". By utilizing the general category of "dogs", the client can direct network users having a dog interest to his site advertising the puppy store. In this manner, the client has more effectively utilized the domain name to direct pertinent traffic to his site.

Further, embodiments of the domain management system provide the provider host with the ability to scale domains such that the servers can host a virtually unlimited number of domains as there is no requirement for a unique IP address for each subdomain. Indeed, the use of the wildcard DNS allows unlimited subdomain names to be created for each domain on the servers. In this manner, the servers are capable of referencing a virtually unlimited number of subdomains. The ability to scale domains decreases labor and material costs. Further, the use of the wild card DNS to denote domain names increases the expediency with which a newly assigned domain name can be propagated throughout the network as the newly assigned name is stored in a provider maintained register and is referenced by the VIP address of the wildcard provider domain name stored in the DNS database. The use of the provider maintained register eliminates the need to update the DNS database.

Although the foregoing described the invention with embodiments having particular forms that have been illustrated and described, this is not intended to limit the invention. Rather, the foregoing is intended to cover all modifications and alternative constructions falling within the spirit and scope of the invention as expressed in the appended claims.

What is claimed is:

1. A method for enabling internet access to content located by a domain name, the domain name including a user-selected subdomain label that is not associated with an IP address in a zone file of any higher-level domain, the method comprising:

operating a host having an IP address specified by an internet-class resource record for a domain name server, in that the resource record associates the host IP address to a host domain name in a zone file of the domain name server, and wherein the host domain name comprises (a) a subdomain labeled with a designated wildcard character of a domain name system and (b) at least one: higher-level domain name;

configuring a content address according to a content storage system of the host independently of the domain name system, the content address comprising a user-selected label, wherein the user-selected label comprises at least one character that is not the designated wildcard character;

storing content in the content storage system, the content addressed by the content address;

receiving a domain name configured in accordance with the domain name system, the domain name comprising the host domain name with the user-selected label substituted for the designated wildcard character;

determining the content address from the user-selected label;

retrieving the content from the content storage system using the content address; and serving the content.

2. The method of claim 1, further comprising maintaining a searchable database of a plurality of user-selected labels, each of the plurality of user-selected labels associated with a corresponding content address of the content storage system.

3. The method of claim 1, wherein the serving step further comprises serving a frameset for the content, the frameset comprising at least one provider frame and a client frame.

4. The method of claim 3, wherein the serving step further comprises serving the client frame configured for display of the content.

5. The method of claim 3, wherein the serving step further comprises serving the provider frame configured for display of advertising content.

6. The method of claim 1, wherein the receiving step is performed by a scheduler, and further comprising directing the domain name from the scheduler to a redirector so as to balance load from a plurality of requests.

7. The method of claim 6, wherein the determining step is performed by any one of a plurality of redirectors, each configured for parsing the domain name.

8. The method of claim 1, further comprising receiving the content for storage on the content storage system from a user that selected the user-selected label.

9. The method of claim 1, further comprising comparing the user-selected label to a plurality of previously-selected labels each comprising a corresponding content address of the content storage system.

10. The method of claim 1, further comprising auctioning the user-selected label for bids from a plurality of bidders.

11. The method of claim 1, further comprising defining the user-selected label to appear like nested subdomains of a domain name configured in accordance with the domain name system.

12. A system for enabling internet access to content identified by a user-selected domain name comprising a subdomain, without requiring that the subdomain be associated with an IP address of a higher-level domain, the system comprising:

an internet-connected host computer, the host computer having an IP address specified by an internet-class resource record for a domain name server, wherein the resource record associates the host IP address to a host domain name in a zone file of the domain name server, and wherein the host domain name comprises (a) a subdomain labeled with a designated wildcard character of a domain name system and (b) at least one higher-level domain name;

a memory operably associated with the host computer, the memory holding instructions comprising:

configuring a content address according to a content storage system of the host computer independently of the domain name system, the content address comprising a user-selected label, wherein the user-selected label comprises at least one character that is not the designated wildcard character;

storing content in the content storage system, the content addressed by the content address;

receiving a domain name configured in accordance with the domain name system, the domain name comprising the host domain name with the user-selected label substituted for the designated wildcard character;

determining the content address from the user-selected label;

retrieving the content from the content storage system using the content address; and serving the content.

13. The system of claim 12, wherein the program instructions further comprise maintaining a searchable database of a plurality of user-selected labels, each of the plurality of user-selected labels associated with a corresponding content address of the content storage system.

14. The system of claim 12, wherein the program instructions further comprise serving a frameset for the content, the frameset comprising at least one provider frame and a client frame.

15. The system of claim 14, wherein the program instructions further comprise serving the provider frame configured for display of advertising content.

16. The system of claim 12, further comprising a scheduler connected to the host computer, the scheduler configured to direct the domain name from the scheduler to a redirector so as to balance load from a plurality of requests.

17. The system of claim 12, further comprising a plurality of redirectors, each configured for parsing the domain name.

18. The system of claim 12, wherein the program instructions further comprise receiving the content for storage on the content storage system from a user that selected the user-selected label.

19. The system of claim 12, wherein the program instructions further comprise comparing the user-selected label to a plurality of previously-selected labels each comprising a corresponding content address of the content storage system.

20. The system of claim 12, wherein the program instructions further comprise auctioning the user-selected label for bids from a plurality of bidders.

* * * * *

US006687746C1

(12) EX PARTE REEXAMINATION CERTIFICATE (8925th)
United States Patent
Shuster et al.

(10) Number: US 6,687,746 C1
(45) Certificate Issued: Mar. 27, 2012

(54) SYSTEM APPARATUS AND METHOD FOR HOSTING AND ASSIGNING DOMAIN NAMES ON A WIDE AREA NETWORK

(75) Inventors: Brian Shuster, Stateline, NV (US);
Johnson Leong, San Jose, CA (US);
Matthew Price, Santa Clara, CA (US);
Brian Lam, Sunnyvale, CA (US);
Desmond Ford Johnson, Monte Sereno, CA (US)

(73) Assignee: Hoshiko, LLC, Henderson, NV (US)

Reexamination Request:
No. 90/010,012, Aug. 22, 2007

Reexamination Certificate for:
Patent No.: 6,687,746
Issued: Feb. 3, 2004
Appl. No.: 09/386,529
Filed: Aug. 30, 1999

(51) Int. Cl.
*G06F 15/173* (2006.01)
*G06F 15/16* (2006.01)
*G06F 17/30* (2006.01)
*G06F 7/00* (2006.01)

(52) U.S. Cl. .............................. 709/223; 707/999.005; 707/999.007; 709/218; 709/219; 709/245

(58) Field of Classification Search .................... 709/223
See application file for complete search history.

(56) References Cited

To view the complete listing of prior art documents cited during the proceeding for Reexamination Control Number 90/010,012, please refer to the USPTO's public Patent Application Information Retrieval (PAIR) system under the Display References tab.

*Primary Examiner* — William H. Wood (57) ABSTRACT

Embodiments of the instant invention are directed to a domain management system, apparatus and method for hosting and assigning domain names. Embodiments of the domain management system comprise a name assignment system and a hosting system, wherein the hosting system comprises a domain retrieval system and a data storage apparatus. The name assignment system verifies availability and assigns domain names to requesting clients. The name assignment system comprises an input component, a confirmation mechanism and a name storage means. Preferred embodiments of the domain retrieval system comprise a scheduler, a parsing member having a plurality of redirectors and a plurality of servers. The domain retrieval system locates the domain referenced by the domain name by parsing header information and utilizing a wildcard DNS. Once the domain is located, the domain retrieval system forwards the domain to the user computer.

At the time of issuance and publication of this certificate, the patent remains subject to pending reissue application No. 12/648,936, filed Dec. 29, 2009. The claim content of the patent may be subsequently revised if a reissue patent is issued from the reissue application.

US 6,687,746 C1

EX PARTE
REEXAMINATION CERTIFICATE
ISSUED UNDER 35 U.S.C. 307

THE PATENT IS HEREBY AMENDED AS
INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 6-12 and 16-20 are cancelled.

Claims 2-3 and 13-14 are determined to be patentable as amended.

Claims 4-5 and 15, dependent on an amended claim, are determined to be patentable.

2. [The method of claim 1, further comprising] *A method for enabling internet access to content located by a domain name, the domain name including a user-selected subdomain label that is not associated with an IP address in a zone file of any higher-level domain, the method comprising:*
   *operating a host having an IP address specified by an internet-class resource record for a domain name server, in that the resource record associates the host IP address to a host domain name in a zone file of the domain name server, and wherein the host domain name comprises (a) a subdomain labeled with a designated wildcard character of a domain name system and (b) at least one higher-level domain name;*
   *configuring a content address according to a content storage system of the host that is independent of the domain name system, the content address defined by a user-selected label, wherein the user-selected label comprises at least one character that is not the designated wildcard character;*
   *storing content in the content storage system, the content addressed by the content address;*
   maintaining a searchable database of a plurality of user-selected labels, *the database relating* each of the plurality of user-selected labels [associated with] *to* a corresponding content address of the content storage system;
   *receiving an HTTP request comprising a domain name configured in accordance with the domain name system at the host IP address, the domain name comprising the host domain name with the user-selected label substituted for the designated wildcard character;*
   *determining the content address from the user-selected label, in response to receiving the HTTP request;*
   *retrieving the content from the content storage system using the content address; and*
   serving the content.

3. [The method of claim 1, wherein the serving step further comprises] *A method for enabling internet access to content located by a domain name, the domain name including a user-selected subdomain label that is not associated with an IP address in a zone file of any higher-level domain, the method comprising:*
   *operating a host having an IP address specified by an internet-class resource record for a domain name server, in that the resource record associates the host IP address to a host domain name in a zone file of the domain name server, and wherein the host domain name comprises (a) a subdomain labeled with a designated wildcard character of a domain name system and (b) at least one higher-level domain name;*
   *configuring a content address according to a content storage system of the host that is independent of the domain name system, the content address defined by a user-selected label, wherein the user-selected label comprises at least one character that is not the designated wildcard character;*
   *storing content in the content storage system, the content addressed by the content address;*
   *receiving an HTTP request comprising a domain name configured in accordance with the domain name system at the host IP address, the domain name comprising the host domain name with the user-selected label substituted for the designated wildcard character;*
   *determining the content address from the user-selected label, in response to receiving the HTTP request;*
   *retrieving the content from the content storage system using the content address;*
   serving a frameset for the content *in response to receiving the HTTP request*, the frameset comprising at least one provider frame and a client frame *containing the content address, and wherein retrieving the content from the storage system is performed in response to receiving the content address in the frameset back from the client; and*
   *serving the content.*

13. [The system of claim 12, wherein the program instructions further comprise] *A system for enabling internet access to content identified by a user-selected domain name comprising a subdomain, without requiring that the subdomain be associated with an IP address of a higher-level domain, the system comprising:*
    *an internet-connected host computer, the host computer having an IP address specified by an internet-class resource record for a domain name server, wherein the resource record associates the host IP address to a host domain name in a zone file of the domain name server, and wherein the host domain name comprises (a) a subdomain labeled with a designated wildcard character of a domain name system and (b) at least one higher-level domain name;*
    *a memory operably associated with the host computer, the memory holding instructions comprising:*
    *configuring a content address according to a content storage system of the host computer that is independent of the domain name system, the content address defined by a user-selected label, wherein the user-selected label comprises at least one character that is not the designated wildcard character:*
    *storing content in the content storage system, the content addressed by the content address;*
    maintaining a searchable database of a plurality of user-selected labels, *the database relating* each of the plurality of user-selected labels [associated with] *to* a corresponding content address of the content storage system;
    *receiving an HTTP request comprising a domain name configured in accordance with the domain name system* at the host, the domain name comprising the host domain name with the user-selected label substituted for the designated wildcard character;

determining the content address from the user-selected label, in response to receiving the HTTP request:

retrieving the content from the content storage system using the content address; and serving the content.

14. [The system of claim 12, wherein the program instructions further comprise] *A system for enabling internet access to content identified by a user-selected domain name comprising a subdomain, without requiring that the subdomain be associated with an IP address of a higher-level domain, the system comprising:*

*an internet-connected host computer, the host computer having an IP address specified by an internet-class resource record for a domain name server, wherein the resource record associates the host IP address to a host domain name in a zone file of the domain name server, and wherein the host domain name comprises (a) a subdomain labeled with a designated wildcard character of a domain name system and (b) at least one higher-level domain name:*

*a memory operably associated with the host computer, the memory holding instructions comprising:*

*configuring a content address according to a content storage system of the host computer that is independent of the domain name system, the content address defined by a user-selected label, wherein the user-selected label comprises at least one character that is not the designated wildcard character;*

*storing content in the content storage system, the content addressed by the content address;*

*receiving an HTTP request comprising a domain name configured in accordance with the domain name system at the host, the domain name comprising the host domain name with the user-selected label substituted for the designated wildcard character;*

*determining the content address from the user-selected label, in response to receiving the HTTP request;*

*retrieving the content from the content storage system using the content address;*

*serving a frameset for the content* in response to receiving the domain name, *the frameset comprising at least one provider frame and a client frame* containing the content address, and retrieving the content from the content storage system is performed in response to receiving the content address in the frameset back from the client; *and*

*serving the content.*

* * * * *